Patented July 29, 1952

2,605,221

UNITED STATES PATENT OFFICE 2,605,221

TREATMENT OF AQUEOUS WELL-DRILLING FLUIDS

Raymond W. Hoeppel, Los Angeles, Calif., assignor to National Lead Company, New York, N. Y., a corporation of New Jersey No Drawing. Application August 7, 1948, Serial No. 43,162

10 Claims. (Cl. 252—8.5)

This invention relates to the art of drilling wells by the employment of an aqueous mud-laden fluid, particularly as employed in the rotary system of drilling. More particularly, this invention relates to the treatment of such fluids to control their consistency, viz., the viscosity and thixotropic properties thereof.

Mud-laden fluids as employed in drilling, generally have incorporated in the water phase a solid in order to impart viscosity and thixotropic properties to the fluid. Such solids may be a clay as obtainable at the well, or one of the natural clays. Frequently, however, a concentrated colloidal clay, such as bentonite of the Wyoming swelling type, is added. Where salt water is encountered, a fuller's earth of the Georgia-Florida type is also employed, and in some cases a gelatinized starch is added. Where formation pressures in excess of hydrostatic pressures are encountered, then a weighting material such as barytes is added.

In order to control the consistency of a drilling fluid, various chemicals are employed, such as, orthophosphates, polyphosphates, tannates, humates, and phytates all of these are non-acid-forming. In many cases, however, the extent to which a drilling fluid can be controlled by such chemicals is limited, and over-treating results in a thickening of the fluid. These chemicals may be conveniently classed as "normally deflocculating peptizing" compounds, although that term is used descriptively, and not limitatively.

Many compounds, particularly in the form of salts, produce the opposite effect on a drilling fluid than do the compounds classed above as deflocculating agents; accordingly these compounds will hereafter be classed as "normally flocculating" agents, although that term is used descriptively and not limitatively. They are generally electrolytes whose cations are respectively aluminum, barium, cadmium, calcium, cerium, chromium, cobalt, copper, iron, lead, magnesium, manganese, mercury, nickel, strontium, thorium, tin, uranium, and zinc. They may also be conveniently classed as "heavy-metal" compounds.

While some heavy-metal compounds such as described in applicant's Patent Number 2,414,647, viz. the insoluble polyphosphates of a heavy metal of a class consisting of copper, nickel, iron and titanium, are useful for controlling the viscosity and thixotropic properties of a drilling fluid, and may therefore be classed as deflocculating agents, generally the electrolytes of the heavy metals are flocculating agents, and are therefore not useful for controlling the viscosity and thixotropic properties of a drilling fluid.

One of the objects of this invention is to provide for the treatment of a well-drilling fluid in an improved manner, and by the synergistic action of two classes of compounds.

Further objects will appear from the detail description, in which will be set forth a number of embodiments; it will be understood, however, that this invention is susceptible of various embodiments within the scope of the appended claims.

Applicant has discovered that while the treatment of a well-drilling fluid with a normally flocculating electrolyte disadvantageously affects consistency of such a fluid; in the presence of a normally deflocculating peptizing compound, the two act together synergistically so that the normally flocculating compounds will actually add to the consistency controlling ability of the normally deflocculating peptizing compound, to actually reduce the viscosity and gel strength of a drilling fluid by the synergistic action of the compounds more than will the normally deflocculating compound when used alone; i. e. below that when a like amount of the deflocculating compound is used alone.

Generally stated, in accordance with illustrative embodiments of this invention, the drilling fluid has added thereto sufficient of a normally flocculating heavy-metal compound, in the presence of sufficient of a non-acid-forming normally deflocculating peptizing compound; with the result that by the synergistic action of the two, the viscosity and gel strength will be effectively controlled. In accordance with this invention, therefore, a fluid containing a normally deflocculating peptizing compound may have its viscosity and gel strength further reduced by the addition of a normally flocculating heavy-metal compound. The two compounds are employed in such synergistic percentages as to substantially reduce the consistency of the fluid. The normally flocculating peptizing compound may be a soluble (in water) heavy-metal salt which acts more quickly than does the water-insoluble type; however, the effectiveness may diminish upon heating of the fluid, and consequently the undissolved, retardedly water-soluble type may be more desirable. The retardedly soluble type sometimes may not actually flocculate the mud because of its insolubility, but its cations nevertheless will normally be strong flocculating agents once in solution.

The normally flocculating, heavy-metal compounds or electrolytes found suitable for employment with the normally deflocculating peptizing compounds are the compounds of aluminum, cadmium, calcium, chromium, cobalt, copper, iron, lead, manganese, mercury, nickel, tin, uranium and zinc. These compounds may be in the soluble form, such as the chlorides, sulphates, acetates, nitrates, etc.; or in the undissolved, retardedly soluble form, such as the hydroxides, phosphates, carbonates, borates, citrates, tartrates, oxalates, arsenites, arsenates, stannites, stannates, oxides, fluorides, oxychlorides, silicates, sulfites, etc. The heavy metal compound may also be a base-exchange product, produced by the action of a heavy-metal cation on an inorganic or organic, base-exchanger. An example of an inorganic base-exchanger is bentonite, which when treated for instance with copper sulphate followed by solution in water, filtering off solids, and drying, produces cupric bentonite. As an example of an organic base-exchange product, a synthetic resin such as the commercially available cation exchange resins may be treated with a soluble heavy metal salt such as copper sulphate. Moreover, sulphonated coal, produced by treating bituminous coal with concentrated sulphuric acid, may be treated with a similar salt such as copper chloride or chromium nitrate, followed by washing to remove excess electrolytes. Moreover, the cation exchange materials described in Wayne Patent Number 2,331,281 may be employed.

A number of illustrative examples will be given in the form of tables. In these tables, the following should be observed:

Amt. lb./bbl. means the amount used in pounds per barrel;
C. P. means chemically pure;
Visc. cpe. means viscosity in centipoises, on a Stormer viscosimeter, in accordance with standard procedure;
Init. gel. means initial gel strength in grams, G, on a Stormer viscosimeter;
5' gel means 5 minute gel strength in grams, G, on a Stormer instrument;
pH means the hydrogen-ion concentration;
30' Cor. W. L. ml. means a 30 minute corrected water loss in cubic centimeters in accordance with standard procedure;
ml./dl. means cubic centimeters per 100 cubic centimeters of mud.

The pounds per barrel lb./bbl. is based upon a barrel capacity of 42 gallons. The abbreviation me./l. means milliequivalents per liter.

The McKittrick Mud employed was made up of a light McKittrick, as mined in the vicinity of McKittrick, California, by the McKittrick Mud Company. The Wilmington slough mud was made from Wilmington slough clay, mined in the neighborhood of Wilmington, California, by the Rotary Materials Company. The Barnsdall mud, Table 12, was made up of local clays. The quebracho was the standard quebracho extract, as heretofore employed. The humate in Table 6 was a young brown coal, that is, a very young lignite, which is mainly a humate. The tap water was Los Angeles tap water. "Impermex" is a gelatinized starch, made in accordance with United States Patent No. 2,414,668. The preservative where used was paraformaldehyde. "Aeroflow 40" was a commercial mud treating agent reliably believed to consist of dicyandiamide admixed with about 2 percent nigrosine.

Table 1.—Effect of heavy metal salts on a McKittrick mud [1] treated with quebracho

| Salt Added | | After 30 Minutes at 75° F. | | | | |
|---|---|---|---|---|---|---|
| Amt. lb/bbl.[2] | Type (All C. P.) | Visc. Cpe. | Init. Gel G | 5' Gel G | pH | 30' Cor. W. L. ml. |
| 0 | Blank | 100 | 150 | 300 | 10.20 | 9.5 |
| 0.30 | $CuSO_4$ | 59 | 44 | 230 | 9.60 | 9.2 |
| 0.52 | $FeSO_4.7H_2O$ | 64 | 65 | 230 | 9.55 | 9.8 |
| 0.49 | $NiSO_4.6H_2O$ | 43 | 18 | 180 | 9.70 | 9.5 |
| 0.52 | $CoSO_4.7H_2O$ | 70 | 75 | 230 | 9.80 | 9.5 |
| 0.42 | $SnCl_2.2H_2O$ | 16.5 | 1 | 40 | 9.65 | 10.0 |
| 0.54 | $ZnSO_4.7H_2O$ | 59 | 40 | 220 | 9.90 | 9.6 |
| 0.58 | $Cd(NO_3)_2.4H_2O$ | 86 | 105 | 270 | 10.10 | |

[1] 22% Light McKittrick mud prepared in distilled water, aged 3 days and treated with 0.5 lb./bbl. quebracho plus 0.25 lb./bbl. NaOH.
[2] Roughly equivalent amounts.

Table 2.—Effect of various heavy metal salts on a light McKittrick mud [1] treated with quebracho

| Salt Added | | After 20' at 75° F. | | | | After 18 Hours at 150° F. | | | | |
|---|---|---|---|---|---|---|---|---|---|---|
| Amt. lb/bbl. | Type (All C. P.) | Visc. Cpe. | Init. Gel G | 5' Gel G | pH | Visc. Cpe. | Init. Gel G | 5' Gel G | pH | 30' Cor. W. L. ml. |
| 0 | Blank | 43 | 30 | 150 | 10.10 | 84 | 80 | 215 | 9.25 | 10.6 |
| 0.43 | $NiSO_4.6H_2O$[2] | 9.2 | 0 | 13 | 10.05 | 52 | 40 | 165 | 9.15 | 9.2 |
| 0.30 | $CrCl_3.XH_2O$[2] | 23.0 | 4 | 105 | 9.75 | 42 | 12 | 120 | 9.20 | 9.9 |
| 0.30 | $CuSO_4$[2] | 23.0 | 2 | 115 | 10.00 | 51 | 28 | 160 | 9.40 | 9.8 |

[1] 22% Light McKittrick mud prepared in distilled water, aged 6 days at 75° F., plus 10 ml./dl. wate plus 0.5 lb./bbl. quebracho plus 0.12 lb./bbl. NaOH added just before tests.
[2] 0.12 lb./bbl. NaOH in addition added to mud after adding heavy metal salt.

Table 3.—Effect of heavy metal salts on a McKittrick mud [1] in the presence and absence of quebracho

| Salt added | | Quebracho Added lb./bbl.[2] | After 10 to 30 Minutes at 75° F. | | | | |
|---|---|---|---|---|---|---|---|
| Amt. lb./bbl. | Type (All C. P.) | | Visc. Cpe. | Init. Gel. G | 5' Gel. G | pH | 30' Cor. W. L. ml. |
| 0 | Blank | 0 | 118 | 150 | ------ | 10.50 | ------ |
| 0 | ---do--- | 0.5 | 136 | 180 | 320 | 10.10 | 10.0 |
| 0.42 | SnCl$_2$.2H$_2$O | 0 | 123 | 160 | ------ | 9.35 | ------ |
| 0.42 | SnCl$_2$.2H$_2$O | 0.5 | 43 | 7 | 150 | 9.10 | 10.6 |
| 0.30 | CuSO$_4$ | 0 | 159 | 230 | ------ | 9.85 | ------ |
| 0.30 | CuSO$_4$ | 0.5 | 109 | 110 | 320 | 9.40 | 9.4 |

[1] 22% Light McKittrick mud prepared in distilled water, stirred 1 day at 90° F. and treated with 0.19 lb./bbl. NaOH.
[2] Added after adding heavy metal salt.

Table 4.—Effect of insoluble heavy metal salts in a light McKittrick mud [1] treated with quebracho

| Salt Added | | After Rolling 48 Hours at 150° F. | | | | |
|---|---|---|---|---|---|---|
| Amt. lb./bbl.[2] | Type (All C. P.) | Visc. Cpe. | Init. Gel. G. | 5' Gel G | pH | 30' Cor. W. L. ml. |
| 0 | Blank | 201 | 170 | 320 | 9.00 | 9.8 |
| 0.49 | Sn$_2$OCL$_2$ | 43 | 1 | 2 | 8.70 | 9.5 |
| 0.43 | NiCO$_3$ | 181 | 160 | 320 | 8.95 | 9.0 |
| 0.40 | CuCO$_3$.Cu(OH)$_2$ | 123 | 52 | 240 | 8.95 | 9.7 |
| 0.96 | PbCO$_3$ | 192 | 160 | 280 | 9.10 | 10.3 |
| 0.46 | ZnCO$_3$ | 165 | 140 | 220 | 9.00 | 9.1 |

[1] 24% Light McKittrick mud prepared in distilled water, stirred 18 hours at 90° F., diluted with 10 ml./dl. water and treated with 0.5 lb./bbl. quebracho plus 0.25 lb./bbl. NaOH.
[2] Approximately equivalent amounts.

Table 5.—Effect of various heavy metal soluble and insoluble salts on a light McKittrick mud [1] treated with quebracho

| Salt Added | | After 18 Hours at 150° F. | | | | |
|---|---|---|---|---|---|---|
| Amt. lb/bbl. | Type (All C. P.) | Visc. Cpe. | Init. Gel G | 5' Gel G | pH | 30' Cor. W. L. ml. |
| 0 | Blank | 104 | 85 | 250 | 9.40 | 11.6 |
| 0.4 | CuCO$_3$.Cu(OH)$_2$ | 51 | 13 | 125 | 9.30 | 10.0 |
| 0.4 | NiSnO$_3$ | 86 | 80 | 245 | 9.40 | 10.2 |
| 0.4 | CuSnO$_3$ | 55 | 18 | 140 | 9.50 | 11.0 |
| 0.3 | UO$_2$(C$_2$H$_3$O$_2$)$_2$.2H$_2$O | 78 | 52 | 200 | 8.95 | 11.6 |

[1] 24% light McKittrick prepared in distilled water, aged 24 hours at 90° F. while stirring, diluted with 15 ml./dl. distilled water and treated with 0.5 lb./bbl. quebracho plus 0.25 lb./bbl. NaOH.

Table 6.—Effect of soluble heavy metal salts on McKittrick mud [1] treated with a humate

| Heavy Metal Salt | | Humate Amt.[3] lb./bbl. | NaOH lb./bbl. | After 30'–60' At 75° F. | | | |
|---|---|---|---|---|---|---|---|
| Amt.[2] | Type | | | Visc. Cpe. | Init. Gel. G | 5' Gel G | pH |
| 0 | Blank | 0 | 0 | 145 | 160 | 300 | 9.05 |
| 0 | ---do--- | 0.50 | 0.16 | 136 | 160 | 250 | 9.90 |
| 0.30 | CuSO$_4$ | 0.50 | 0.16 | 127 | 140 | 250 | 9.20 |
| 0.49 | FeSO$_4$.7H$_2$O | 0.50 | 0.16 | 86 | 80 | 200 | 9.00 |
| 0.49 | NiSO$_4$.6H$_2$O | 0.50 | 0.16 | 167 | 250 | ------ | 9.25 |

[1] 22% light McKittrick mud prepared in distilled water, aged 16 months and diluted with 10 ml./dl. distilled water before use.
[2] Approximately equivalent amounts.
[3] An untreated very young brown coal—A very young lignite.

Table 7.—Effect of copper salts on a salt-contaminated McKittrick mud [1] treated with 0.35 lb./bbl. $Na_4P_2O_7$

| Salt Added | | After 1 Hr. Rolling at 75° F.+Stand 18 Hours at 150° F. | | | | | | | | |
|---|---|---|---|---|---|---|---|---|---|---|
| Amt. lb./bbl. | Type | Visc. Cpe. | Init. Gel G | 5' Gel G | pH | Visc. Cpe. | Init. Gel G | 5' Gel G | pH | 30' Cor. W. L. ml. |
| 0 | Blank | 25.0 | 23 | 95 | 8.85 | 27.0 | 20 | 90 | 8.85 | 14.4 |
| 0.07 | $CuSO_4$(C. P.) | 20.0 | 7 | 75 | 8.70 | 23.0 | 12 | 80 | 8.75 | 14.4 |
| 0.30 [2] | $CuSO_4$(C. P.) | 14.1 | 1 | 60 | 8.30 | 21.0 | 6 | 85 | 8.40 | 14.3 |
| 0.60 | $CuSO_4$(C. P.) | 20.0 | 7 | 95 | 8.00 | 24.5 | 17 | 90 | 7.95 | 14.8 |
| 0.32 [2] | $CuCl_2.2H_2O$ (C. P.) | 13.4 | 1 | 60 | 8.20 | 21.5 | 7 | 90 | 8.25 | 14.8 |
| 0.37 [2] | $CuB_2O_7$ | 19.0 | 5 | 65 | 8.85 | 19.0 | 4 | 70 | 8.75 | 14.2 |
| 0.23 [2] | $CuCO_3.Cu(OH)_2$(C. P.) | 20.0 | 7 | 75 | 8.85 | 19.0 | 5 | 70 | 8.85 | 14.0 |
| 0.29 [2] | $Cu_3(AsO_3)_2$ | 20.0 | 7 | 75 | 8.85 | 19.5 | 7 | 70 | 8.85 | 14.3 |

[1] 24% light McKittrick mud prepared in distilled water, aged 10 months, diluted with 27 ml./dl. distilled water, and treated with 1.5 g./dl. NaCl and 0.35 lb./bbl. $Na_4P_2O_7$ just before tests.
[2] Approximately chemically equivalent amounts.

Table 8.—Effect of heavy metal salts on Wilmington slough mud [1] contaminated with $Na_2HPO_4$ and NaCl

| Heavy Metal Salt | | $Na_4P_2O_7$ Added lb./bbl. | After 30'-60' at 75° F. | | | | +18 Hours at 75° F. | | | | 30' Cor. W. L. ml. |
|---|---|---|---|---|---|---|---|---|---|---|---|
| Amt. lb./bbl.[2] | Type | | Visc. Cpe. | Init. Gel G | 5' Gel G | pH | Visc. Cpe. | Init. Gel G | 5' Gel G | pH | |
| 0 | Blank | 0 | 25.0 | 12 | 70 | 8.60 | 25.5 | 14 | 75 | 8.65 | 10.2 |
| 0 | ----do---- | 0.35 | 24.0 | 2 | 50 | 8.85 | 24.5 | 1 | 55 | 8.85 | 10.5 |
| 0.4 | $Cu_3(C_6H_5O_7)_2$ | 0 | 19.0 | 8 | 50 | 8.30 | 19.0 | 8 | 60 | 8.40 | 10.2 |
| 0.4 | $Cu_3(C_6H_5O_7)_2$ | 0.35 | 14.1 | 0 | 33 | 8.50 | 18.5 | 0 | 40 | 8.60 | 9.7 |
| 0.35 | $MnCl_2.4H_2O$ | 0.35 | 19.5 | 1 | 50 | 8.50 | 23.0 | 1 | 55 | 8.60 | 10.1 |
| 0.30 | $CuSO_4$ | 0 | 22.0 | 10 | 65 | 8.35 | 23.0 | 12 | 70 | 8.45 | 10.0 |
| 0.49 | $FeSO_4.7H_2O$ | 0 | 23.0 | 10 | 70 | 8.15 | 24.0 | 13 | 75 | 8.35 | 10.2 |

[1] 24% Wilmington slough mud made up in L. A. tap water, aged 2 days, plus 3.5 lb./bbl. $Na_2HPO_4$ plus .05 g./dl. NaCl, aged 2 days at 150° F. and 30 days at 75° F.
[2] Approximately chemically equivalent amounts.

Table 9.—Effect of soluble heavy metal salts on salt-contaminated McKittrick mud [1] treated with $Na_6P_6O_{18}$

| Heavy Metal Salt | | After 30' at 75° F. | | | | |
|---|---|---|---|---|---|---|
| Amt. lb./bbl.[2] | Type | Visc. Cpe. | Init. Gel G | 5' Gel G | pH | 30' Cor. W. L. ml. |
| 0 | Blank | 174 | 280 | 650 | 8.70 | 11.7 |
| 0.30 | $CuSO_4$ | 167 | 280 | 480 | 8.20 | 11.9 |
| 0.47 | $FeSO_4.7H_2O$ | 136 | 250 | 480 | 7.90 | 11.1 |

[1] 22% light McKittrick mud made up in distilled water, aged 16 months, diluted with 10 ml./dl. distilled water, and treated with 0.4 lb./bbl. $Na_6P_6O_{18}$ and 0.9 g./dl. NaCl 18 hours before adding heavy metal salts.
[2] Approximately chemically equivalent amounts.

Table 10.—Effect of various soluble heavy metal salts on a field mud [1] treated with $Na_4P_2O_7$

| Salt Added | | Initial | | | | After 3 Days at 75° F. | | | |
|---|---|---|---|---|---|---|---|---|---|
| Amt. lb./bbl.[2] | Type (All C. P.) | Visc. Cpe. | Init. Gel G | 5' Gel G | pH | Visc. Cpe. | Init. Gel G | 5' Gel G | pH |
| 0 | Blank | 80 | 7 | 75 | 8.80 | 64 | 6 | 70 | 8.70 |
| 0.29 | $CuSO_4$ | 44 | 2 | 45 | 8.60 | 35.0 | 2 | 25 | 8.55 |
| 0.23 | $CrCl_3.XH_2O$ | 43 | 2 | 30 | 8.40 | 34.5 | 1 | 20 | 8.60 |
| 0.23 | $Fe_2(SO_4)_3$ | 64 | 4 | 75 | 8.40 | 46 | 3 | 45 | 8.50 |
| 0.48 | $FeSO_4.7H_2O$ | 31.0 | 1 | 7 | 8.40 | 26.0 | 0 | 2 | 8.55 |
| 0.48 | $CoSO_4.7H_2O$ | 51 | 3 | 45 | 8.55 | 52 | 4 | 65 | 8.65 |
| 0.46 | $NiSO_4.6H_2O$ | 48 | 3 | 45 | 8.60 | 55 | 4 | 65 | 8.65 |
| 0.48 | $HgCl_2$ | 48 | 3 | 45 | 8.40 | 52 | 4 | 60 | 8.60 |
| 0.49 | $ZnSO_4.7H_2O$ | 60 | 6 | 100 | 8.45 | | | | |
| 0.31 | $Al(C_2H_3O_2)_3$ | 58 | 4 | 55 | 8.30 | 59 | 4 | 65 | 8.70 |
| 0.90 | $UO_2(NO_3)_2.6H_2O$ | 63 | 4 | 75 | 8.20 | 61 | 5 | 65 | 8.50 |
| 0.58 | $Pb(NO_3)_2$ | 58 | 6 | 75 | 8.60 | 61 | 6 | 65 | 8.80 |

[1] Mud received March 5, 1946 from Standard Oil Co. Elk Hills well No. 382-34R, California. This mud contained Impermex and was preserved with a commercial preservative. It was treated with 0.3 lb./bbl. $Na_4P_2O_7$ just before adding heavy metal salt.
[2] Amounts are approximately chemically equivalent.

Table 11.—Effect of various insoluble heavy metal salts on a field mud[1] to which large additions of sodium polyphosphates had been added

| Addition to Mud | | After 30'-60' at 75° F. | | | | After 18 Hours at 150° F. | | | |
|---|---|---|---|---|---|---|---|---|---|
| Amt. lb/bbl. | Type | Visc. Cpe. | Init. Gel G | 5' Gel G | pH | Visc. Cpe. | Init. Gel G | 5' Gel G | pH |
| 0 | Blank | 100 | 13 | 125 | 8.95 | 123 | 23 | 160 | 8.70 |
| 0.5 | Na$_4$P$_2$O$_7$ | 90 | 10 | 110 | 9.10 | 155 | 50 | | 8.75 |
| 0.5 | Na$_2$H$_2$P$_2$O$_7$ | 74 | 5 | 80 | 8.55 | 114 | 17 | 110 | 8.30 |
| 0.5 | Na$_4$P$_4$O$_{13}$ | 90 | 10 | 100 | 8.90 | 132 | 25 | | 8.45 |
| 0.5 | Na$_5$P$_6$O$_{18}$ | 78 | 7 | 85 | 8.80 | 118 | 22 | | 8.35 |
| 0.5 | Quebracho[2] | 97 | 11 | 120 | 9.30 | 130 | 12 | 160 | 8.85 |
| 0.5 | Aeroflo 40[3] | 90 | 11 | 110 | 8.95 | 109 | 17 | 140 | 8.75 |
| 0.5 | CuCO$_3$·Cu(OH)$_2$ | 73 | 9 | | 8.95 | 70 | 6 | 80 | 8.65 |
| 0.5 | CuHPO$_4$ | 81 | 10 | 90 | 8.85 | 73 | 8 | 80 | 8.60 |
| 0.5 | Cu$_3$(AsO$_4$)$_2$ | 64 | 6 | 80 | 8.85 | 77 | 8 | 85 | 8.65 |
| 0.5 | FePO$_4$ | 61 | 6 | 80 | 8.70 | 100 | 12 | 120 | 8.45 |

[1] Impermex mud received March 5, 1946 from Standard Oil Elk Hills, well No. 382-34R, California and preserved with Impermex preservative such as paraformaldehyde.
[2] 0.12 lb./bbl. NaOH added with quebracho.
[3] A commercial thinner specially designed for use in muds heavily treated with polyphosphates.

Table 12.—Effect of heavy metal compounds on a field mud[1]

| Additive | | Initial | | | | + Roll 18 Hours at 150° F.<br>+ Stand 2 Days at 75° F. | | | | |
|---|---|---|---|---|---|---|---|---|---|---|
| Amt. lb./bbl. | Type | Visc. Cpe. | Init. Gel G | 5' Gel G | pH | Visc. Cpe. | Init. Gel G | 5' Gel G | pH | 30' Cor. W. L. ml. |
| 0 | Blank | 27.5 | 8 | 140 | 7.30 | 29.5 | 9 | 105 | 7.60 | 10.7 |
| 0.2 | Na$_2$H$_2$P$_2$O$_7$ | 15.5 | 0 | 30 | 7.35 | 33.0 | 13 | 110 | 7.60 | 10.2 |
| 0.5 | Na$_2$H$_2$P$_2$O$_7$ | 12.7 | 0 | 15 | 7.20 | 34.0 | 13 | 110 | 7.65 | 9.5 |
| 0.2 | Na$_4$P$_2$O$_7$ | 16.5 | 0 | 33 | 7.30 | 36.0 | 18 | 125 | 7.80 | 9.6 |
| 0.5 | cupric bentonite[2] | 18.0 | 4 | 65 | 7.30 | 34.5 | 8 | 80 | 7.95 | 8.5 |
| 0.5 | cupric borate | 19.5 | 3 | 80 | 7.50 | 25.0 | 4 | 50 | 8.00 | 9.2 |
| 0.5 | ferric phytate | 17.0 | 3 | 80 | 7.50 | 26.5 | 9 | 90 | 7.80 | 10.0 |

[1] From Barnsdall Oil Co. well No. RSF 58-6 (Pico Canyon, Calif.) received January 20, 1947.
[2] Prepared by treating 20 grams Wyoming bentonite with 60 g. C. P. CuSO$_4$·5H$_2$O dissolved in 200 ml. water, filtering off solids and drying at 105° C.

From the above, the following will be observed:

With the possible exception of the iron and copper compounds, none are necessarily universally effective when used with alkali metal mud thinners, their effectiveness depending upon: (1) the type of mud used, (2) the pH of the mud, (3) the type and amount of soluble salts present in the mud, (4) the mud temperature, and (5) the types of conventional alkali metal mud thinners present in the mud. For instance, nickelous sulfate very effectively thinned a McKittrick mud treated with caustic soda and quebracho (Table 1), while the same quantity of nickelous sulfate thickened a similar McKittrick mud treated with caustic soda and the humate of Table 6, although CuSO$_4$ and FeSO$_4$ thinned both muds.

The synergistic effect of these heavy metal compounds, when used with alkali metal mud thinners, is most pronounced in muds having a rapid gel rate, such as is produced by: (1) a high colloidal clay content, (2) a high alkali metal concentration, such as from salt contamination or long continued treatment with sodium polyphosphates, (3) contamination with calcium hydroxide or cement, or (4) long continued use of caustic plus tannins for viscosity control or for the preservation of organic colloids.

The thinning action of these heavy metal compounds is accompanied by an appreciable reduction in initial and 5-minute gel strengths and in water loss. In general the pH is slightly lowered, but when water-insoluble types are used the pH often remains unchanged. The optimum thinning effect is usually noted when 10 me./l. of the heavy metal ion has been added in the soluble form. When in the water-insoluble form, slightly more than this amount is desirable. Definite thinning effects have been obtained with as little as 2 me./l. of the heavy metal ion present, but generally not more than 20 me./l. of a soluble heavy metal salt should be added at one time.

Quebracho-treated, uncontaminated McKittrick muds were thinned effectively by soluble salts of tin, nickel, zinc, copper, iron, cobalt, and cadmium (Table 1); by chromium chloride (Table 2), and by uranyl acetate (Table 5). When either stannous chloride or copper sulfate was added to an uncontaminated McKittrick mud, severe flocculation was produced, but upon later adding quebracho these pretreated muds became thinner and more deflocculated than when neither the copper nor tin salts had been initially added (Table 3).

Water-insoluble stannous oxychloride, nickelous, lead and zinc carbonates, and basic cupric carbonate all thinned a quebracho-treated McKittrick mud (Table 4). Likewise nickelous and cupric stannates thinned a similar mud (Table 5). The tests shown in Tables 4 and 5 were obtained after aging the mud at 150° F. for from 18 to 48 hours. Initially the thinning effect of these water-insoluble thinners was not pronounced.

Cupric and ferrous sulfates thinned an uncontaminated McKittrick mud treated with a humate (humate plus caustic soda), but nickelous sulfate thickened this mud (Table 6).

A salt-contaminated McKittrick mud treated with 0.35 lb./bbl. tetrasodium pyrophosphate was effectively thinned by cupric sulfate, chloride, borate, basic carbonate and arsenate (Table 7). The soluble salts were most effective initially, but were less effective than the water-insoluble borate, carbonate and arsenate after heating. The optimum quantity of cupric sulfate appeared to be between .07 and 0.30 lb./bbl., about 2.3 to 10 me./l. respectively, while 0.6 lb./bbl. (20 me./l.) was less effective but still produced an appreciable thinning effect.

A salt-contaminated Wilmington Slough mud, treated with 3.5 lb./bbl. disodium acid orthophosphate (an amount likely to be present in many drilling muds treated with polyphosphates) was effectively thinned by cupric sulfate and citrate and by ferrous sulfate (Table 8). When tetrasodium pyrophosphate was also present, cupric citrate and manganous chloride were synergists.

Cupric and ferrous sulfates were found to thin a salt-contaminated McKittrick mud treated with sodium hexametaphosphate (Table 9).

A field mud, when treated with tetrasodium pyrophosphate was effectively thinned by cupric, ferrous, ferric, cobaltous, nickelous, and zinc sulfates, by chromic and mercuric chlorides, and by uranyl and lead nitrates (Table 10).

A high-gel-rate field mud, which was rather insensitive to alkali metal thinners, was effectively thinned by basic cupric carbonate, di-basic cupric orthophosphate, tri-basic cupric arsenate and tri-basic ferric orthophosphate (Table 11). These thinners were more effective both initially and after aging than conventional thinners such as tetrasodium pyrophosphate, sodium acid pyrophosphate, sodium tetraphosphate, caustic-quebracho, and even Aeroflo 40, a compound sold for the treatment of muds irresponsive to conventional thinners. This mud had been heavily treated with polyphosphates throughout its use and doubtless contained some polyphosphates together with considerable orthophosphates.

Another high-gel-rate field mud was effectively thinned initially by sodium acid pyrophosphate and tetrasodium pyrophosphate, but after heating the muds treated with these alkali metal compounds were generally of poorer quality than the untreated blank (Table 12). This mud initially was almost as effectively thinned by cupric bentonite, cupric borate and ferric phytate, and after heating, muds treated with those heavy metal compounds were vastly superior to those treated with the alkaline polyphosphates. Although the viscosity of the mud treated with cupric bentonite was not greatly reduced, the final gel strength was satisfactory and the water loss was exceptionally low. The heavy metal compounds raised the pH of this mud to a greater extent than the conventional thinners. This is a desirable effect.

It will be seen from the above that a remarkable synergism exists between the two groups of compounds. This synergism is all the more remarkable when it is considered that the ions of the heavy metal compounds are normally strong flocculating agents in the absence of the normally deflocculating peptizing agents. The soluble heavy metal salts or electrolytes are rapid in their action, but lose their effectiveness rather quickly on heating. On the other hand, the retardedly soluble heavy metal salts are slower acting, but have greater effectiveness at elevated temperatures. Of course, in the drilling of a well, in some cases high temperatures are not encountered, and in such a case of course the soluble heavy metal salts can be advantageously employed. Where, however, high well temperatures are encountered, then the retardedly soluble type is preferable.

The above tables, while in the form of tests, show the comparative efficiencies of the various agents enumerated, thereby enabling those skilled in the art to employ these agents in those cases where the consistency of a drilling fluid is to be controlled as to viscosity, gel strength, etc. In the treatment of a drilling fluid in accordance with modern practice, agents are not employed haphazard, but a preliminary test is made at the well to determine the effectiveness of an agent and the percentages to be employed. The driller will then be guided during the course of drilling to add such amounts of the agents as are necessary. Where a drilling fluid has been previously treated with a deflocculating agent of the class described, which has been ineffective, or where there is over-treatment, the driller will be furnished a guide to employ the normally flocculating agents.

In the actual treatment of a drilling fluid, the procedure is not of course one of using a given proportion or percentage of the treating agent with reference to the drilling fluid; for the treatment is one of adjusting the consistency of the drilling fluid by the addition of the treating agent. This will be apparent when we consider the fact that during the course of drilling a formation which may contain salts, cement or cuttings, generally the viscosity will be affected by the addition of these formation agents. The water used in the making of the drilling fluid, the temperature of the bottom of the well, and other conditions also affect the viscosity of the drilling fluid. Moreover, in this case there may be an over-treated drilling fluid by the previous additions of deflocculating agents. As a result, the specification of any particular percentage of an agent, with reference to the weight or volume of the drilling fluid, is meaningless. The practical procedure, therefore, is to add the drilling agent in accordance with the requirements in order to secure the desired consistency, viz., viscosity, gel strength, etc., in accordance with the practice at any particular well.

While a number of embodiments have been described above, it will be understood that this invention is susceptible of various other embodiments within the scope of the appended claims. Furthermore, while theories of action have been set forth, this has been done only to facilitate the disclosure, without limitation of the invention to any theory. The expression in some of the claims, "a compound the cation of which is a normally flocculating heavy-metal ion," is used because some readily soluble compounds, such as copper phosphate, are not normally flocculating. They do, however, contain a heavy metal cation which, when liberated, will be normally flocculating.

The invention having thus been described, what is claimed is:

1. In the art of drilling wells by the employment of an aqueous mud-laden drilling fluid, the process comprising, adding to such a fluid sufficient of a compound the cation of which is a normally flocculating heavy-metal ion, in the presence of sufficient of a non-acid-forming normally deflocculating peptizing compound to reduce the consistency of the drilling fluid by the synergistic action of the compounds to below that when a like amount of the deflocculating compound is used alone.

2. In the art of drilling wells by the employment of an aqueous mud-laden fluid, the process comprising, adding to such a fluid, containing sufficient of a non-acid-forming normally peptizing deflocculating compound, sufficient of a compound the cation of which is a normally flocculating heavy-metal ion to reduce the consistency of the drilling fluid by the synergistic action of the compounds to below that when a like amount of the deflocculating compound is used alone.

3. In the art of drilling wells by the employment of an aqueous mud-laden fluid, the process comprising, adding to such a fluid such synergistic percentages of a compound the cation of which is a normally flocculating ion and a non-acid-forming normally deflocculating peptizing compound to reduce the consistency of the drilling fluid by the synergistic action of the compounds to below that when a like amount of the deflocculating compound is used alone.

4. In the art of drilling wells by the employment of an aqueous mud-laden fluid, the process comprising, adding to such a fluid sufficient of an undissolved retardedly soluble compound the cation of which is a normally flocculating heavy-metal ion, in the presence of sufficient of a non-acid-forming normally deflocculating peptizing compound to reduce the consistency of the drilling fluid by the synergistic action of the compounds to below that when a like amount of the deflocculating compound is used alone.

5. In the art of drilling wells by the employment of an aqueous mud-laden fluid, the process comprising, adding to such a fluid sufficient of a soluble compound the cation of which is a normally flocculating heavy-metal ion, in the presence of sufficient of a non-acid-forming normally deflocculating peptizing compound to reduce the consistency of the drilling fluid by the synergistic action of the compounds to below that when a like amount of the deflocculating compound is used alone.

6. In the art of drilling wells by the employment of an aqueous mud-laden fluid, the process comprising, adding to such a fluid sufficient of a compound the cation of which is a normally flocculating heavy-metal ion, in the presence of sufficient of a non-acid-forming normally deflocculating peptizing compound of a class consisting of phosphates, tannates, humates and phytates to reduce the consistency of the drilling fluid by the synergistic action of the compounds to below that when a like amount of the deflocculating compound is used alone.

7. In the art of drilling wells by the employment of an aqueous mud-laden fluid, the process comprising, adding to such a fluid sufficient of an electrolyte of a class whose cations are of the class consisting of respectively: aluminum, barium, cadmium, calcium, cerium, chromium, cobalt, copper, iron, lead, manganese, magnesium, mercury, nickel, strontium, thorium, tin, uranium, and zinc, in the presence of sufficient of a non-acid-forming normally deflocculating peptizing compound to reduce the consistency of the drilling fluid by the synergistic action of the compounds to below that when a like amount of the deflocculating compound is used alone.

8. In the art of drilling wells by the employment of an aqueous mud-laden fluid, the process comprising, adding to such a fluid sufficient of an electrolyte of a class whose cations are of the class consisting of respectively: aluminum, barium, cadmium, calcium, cerium, chromium, cobalt, copper, iron, lead, manganese, magnesium, mercury, nickel, strontium, thorium, tin, uranium and zinc in the presence of sufficient of a non-acid-forming normally deflocculating peptizing compound of a class consisting of phosphates, tannates, humates, and phytates to reduce the consistency of the drilling fluid by the synergistic action of the compounds to below that when a like amount of the deflocculating compound is used alone.

9. In the art of drilling wells by the employment of an aqueous mud-laden fluid, the process comprising, adding to such a fluid sufficient of an undissolved insoluble cationic base exchanger, containing normally flocculating heavy metal cations, in the presence of sufficient of a non-acid-forming normally deflocculating peptizing compound to reduce the consistency of the drilling fluid by the synergistic action of the compounds to below that when a like amount of the deflocculating compound is used alone.

10. In the art of drilling wells by the employment of an aqueous mud-laden fluid, the process comprising, adding to such a fluid sufficient of an undissolved retardedly soluble compound containing a flocculating cation of a class consisting of aluminum, barium, cadmium, calcium, cerium, chromium, cobalt, copper, iron, lead, manganese, magnesium, mercury, nickel, strontium, thorium, tin, uranium and zinc, in the presence of sufficient of a non-acid-forming normally deflocculating peptizing compound to reduce the consistency of the drilling fluid by the synergistic action of the compounds to below that when a like amount of the deflocculating compound is used alone.

RAYMOND W. HOEPPEL.

REFERENCES CITED

The following references are of record in the file of this patent:

UNITED STATES PATENTS

| Number | Name | Date |
| --- | --- | --- |
| 2,327,501 | Chapman | Aug. 24, 1943 |
| 2,331,281 | Wayne | Oct. 12, 1943 |
| 2,331,696 | Jones | Oct. 12, 1943 |
| 2,353,166 | Lanz et al. | July 11, 1944 |
| 2,365,383 | Bond | Dec. 19, 1944 |
| 2,365,489 | Partridge | Dec. 19, 1944 |
| 2,393,166 | Hoeppel | Jan. 15, 1946 |
| 2,414,647 | Hoeppel | Jan. 21, 1947 |

OTHER REFERENCES

Petroleum, Article, vol. 28, No. 44, pgs. 7 and 8 German Pub., November 2, 1932.